United States Patent
Guarneros

(10) Patent No.: US 9,273,781 B2
(45) Date of Patent: Mar. 1, 2016

(54) OVERMOLDED ECU DEVICE

(71) Applicant: Continental Automotive Systems, Inc., Auburn Hills, MI (US)

(72) Inventor: Johnathan Guarneros, Tlajomulco d Zuñiga (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 157 days.

(21) Appl. No.: 13/851,300

(22) Filed: Mar. 27, 2013

(65) Prior Publication Data
US 2014/0291341 A1   Oct. 2, 2014

(51) Int. Cl.
| | |
|---|---|
| *F16L 55/10* | (2006.01) |
| *F16J 13/14* | (2006.01) |
| *G01M 3/32* | (2006.01) |
| *F16J 15/10* | (2006.01) |

(52) U.S. Cl.
CPC ............... *F16J 13/14* (2013.01); *F16J 15/104* (2013.01); *G01M 3/3209* (2013.01)

(58) Field of Classification Search
CPC .............................. F16L 55/11; F16L 55/1141
USPC ...................................................... 138/89, 90
See application file for complete search history.

(56) References Cited

U.S. PATENT DOCUMENTS

| | | | |
|---|---|---|---|
| 2,479,862 A | 8/1949 | Payne | |
| 2,696,106 A | 12/1954 | Schneider | |
| 3,420,259 A * | 1/1969 | Dargitz | 137/270 |
| 3,604,591 A * | 9/1971 | Seltzer | 220/284 |
| 4,194,494 A * | 3/1980 | Wagner | 126/319 |
| 4,502,511 A * | 3/1985 | Zafred | 138/89 |
| 4,503,934 A * | 3/1985 | Stephanus et al. | 184/1.5 |
| 5,062,405 A * | 11/1991 | Daly | 123/468 |
| 5,197,605 A * | 3/1993 | Hampton | 206/582 |
| 5,452,749 A * | 9/1995 | Johnson et al. | 138/96 T |
| 5,694,978 A * | 12/1997 | Heilmann et al. | 138/89 |
| 6,223,776 B1 * | 5/2001 | Glassell et al. | 138/89 |
| 6,455,193 B1 | 9/2002 | Miyazaki et al. | |
| 7,007,719 B2 * | 3/2006 | Fails et al. | 138/97 |
| 8,714,383 B2 * | 5/2014 | Corson | 215/364 |
| 2002/0148521 A1 | 10/2002 | Condon | |

(Continued)

FOREIGN PATENT DOCUMENTS

| | | |
|---|---|---|
| DE | 19721539 A1 | 11/1997 |
| WO | 2004046676 A1 | 6/2004 |

OTHER PUBLICATIONS

The International Search Report and The Written Opinion of the International Searching Authority, PCT/US2014/018687, Dated, Aug. 26, 2014.

*Primary Examiner* — James Hook

(57) ABSTRACT

A sealing device which is used to seal a leak test aperture in an ECU. The sealing device is selectively disposed in the leak test aperture, and an inner surface is formed as part of the leak test aperture. The sealing device has a first portion, and a second portion connected to the first portion. The sealing device is press-fitted into the leak aperture such that the first portion is in contact with the inner surface, securing the position of the sealing device in the leak test aperture, and the second portion is also in contact with the inner surface to prevent moisture and debris from passing through the leak test aperture. The second diameter is larger than the first diameter such that the second diameter of the second portion applies a pressure to the inner surface of the leak test aperture, forming a seal.

10 Claims, 4 Drawing Sheets

(56) References Cited

U.S. PATENT DOCUMENTS

| | | |
|---|---|---|
| 2003/0178792 A1 | 9/2003 | Pridmore |
| 2004/0056039 A1* | 3/2004 | Sarajian .................. 220/801 |
| 2006/0001264 A1* | 1/2006 | Brass et al. .................. 285/901 |
| 2006/0151424 A1* | 7/2006 | Nakada et al. ................ 215/354 |
| 2006/0261029 A1* | 11/2006 | Casini et al. .................. 215/355 |
| 2011/0024907 A1* | 2/2011 | Fujiyama ..................... 257/751 |

* cited by examiner

OVERMOLDED ECU DEVICE

FIELD OF THE INVENTION

Embodiments of the invention relate to a sealing device for sealing a leak test aperture formed as part of a housing of an engine controller.

BACKGROUND OF THE INVENTION

An Electronic Control Unit (ECU) is used in many different types of vehicles to provide control over the operation of various components. The ECU is used to control various actuators which are part of an engine to optimize the operation of the engine. The ECU controls air-fuel mixture, ignition timing, idle speed, and in some more advanced versions of an ECU, variable valve timing, transient fueling, maximum RPM, and the like, are also controlled by the ECU.

The ECU is often required to function in a harsh environment, where the ECU may be exposed to different temperatures, as well as moisture. The ECU includes a cover which is part of a casing, and after assembly, the casing is tested for leaks to make sure that no moisture or debris is able to enter into the casing and damage any internal components. One type of approach to test the ECU for leaks is to force pressurized air into an aperture formed as part of the cover, referred to as a "leak test aperture," and determine if any air leaks out of the casing. Once the test is complete, a seal is deposited into the aperture.

However, current seals used in leak test apertures do not adequately provide assurance that the leak test aperture is sealed. Some of these seals do not provide an adequate sealing function due to die casting surface irregularities in the leak test aperture. Also, the location of the seal in the leak test aperture may not always be known once the ECU is assembled, making it difficult to determine whether the leak test aperture is in fact sealed.

Accordingly, there exists a need for an improved sealing of a leak test aperture once the assembly of the ECU is completed.

SUMMARY OF THE INVENTION

The present invention is a sealing device which is used to seal a leak test aperture in an ECU. In one embodiment, the present invention is an assembly for sealing an aperture, which includes a sealing device selectively disposed in a leak test aperture having an inner surface. The sealing device has a first portion and a second portion connected to the first portion. The first portion of the sealing device has a first diameter, and the second portion has a second diameter. The sealing device is press-fitted into the leak aperture such that the first diameter is in contact with the inner surface, securing the position of the sealing device in the leak test aperture.

When the sealing device is disposed in the leak test aperture, the second diameter is also in contact with the inner surface to prevent moisture and debris from passing through the leak test aperture. The second diameter is larger than the first diameter such that the second diameter of the second portion applies a pressure to the inner surface of the leak test aperture, forming a seal.

In one embodiment, a tapered portion is formed as part of the second portion such that the tapered portion is smaller than the second diameter, and a lower diameter is formed as part of the leak test aperture. The tapered portion is disposed in the lower diameter of the leak test aperture when the sealing device is disposed in the leak test aperture.

The first portion is made of metal, such as steel or aluminum, and the second portion is made of a sealing material, such as silicone rubber (VMQ), acrylonitrile-butadiene rubber (NBR), styrene-butadiene rubber (SBR), ethylene propylene diene rubber (EPDM), other types of synthetic rubber, and the like.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
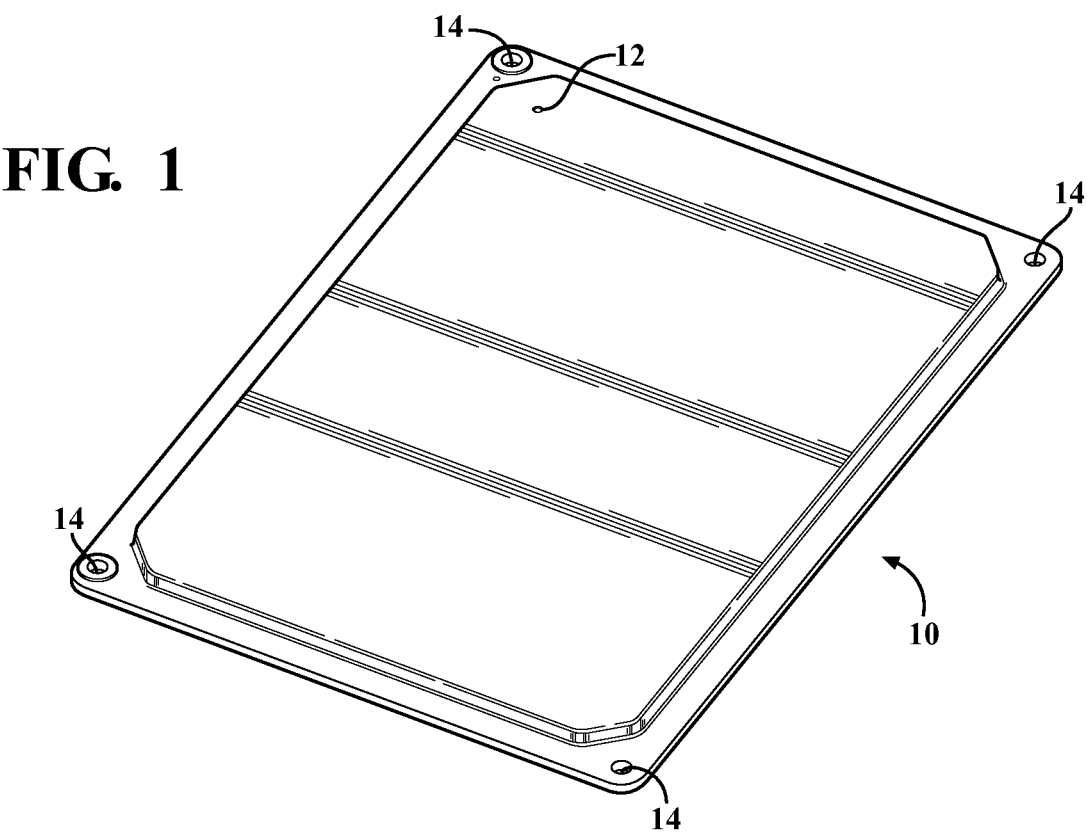
FIG. 1 is perspective view of a cover for an ECU having a leak test aperture which is capable of receiving a sealing device, according to embodiments of the present invention.
Figure 2:
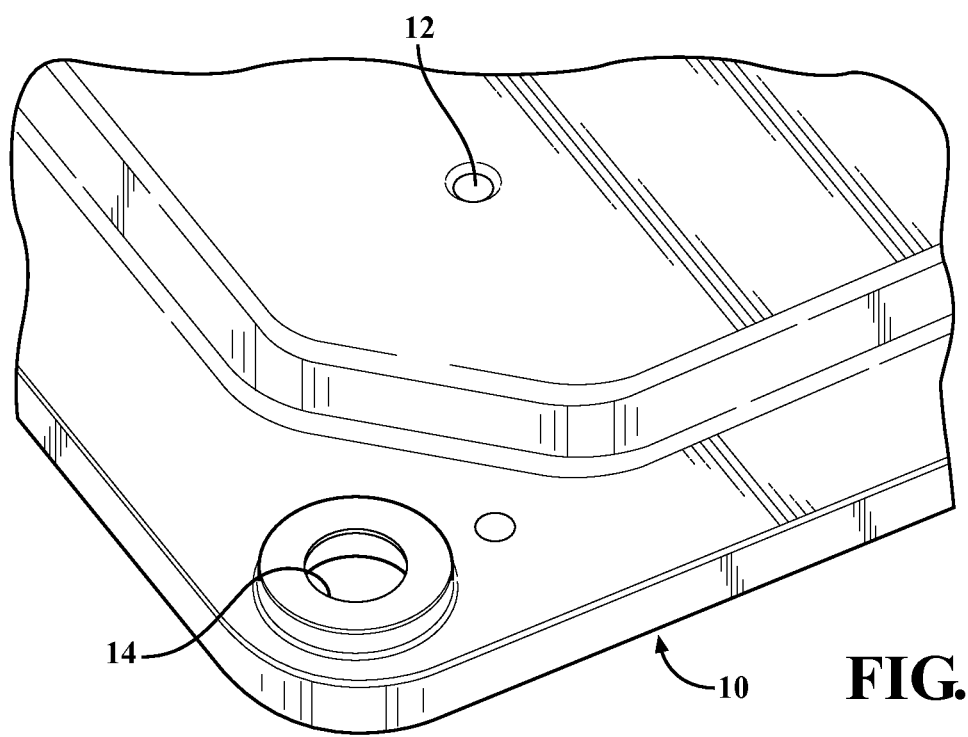
FIG. 2 is an enlarged perspective view of a cover for an ECU having a leak test aperture which is capable of receiving a sealing device, according to embodiments of the present invention.
Figure 3:
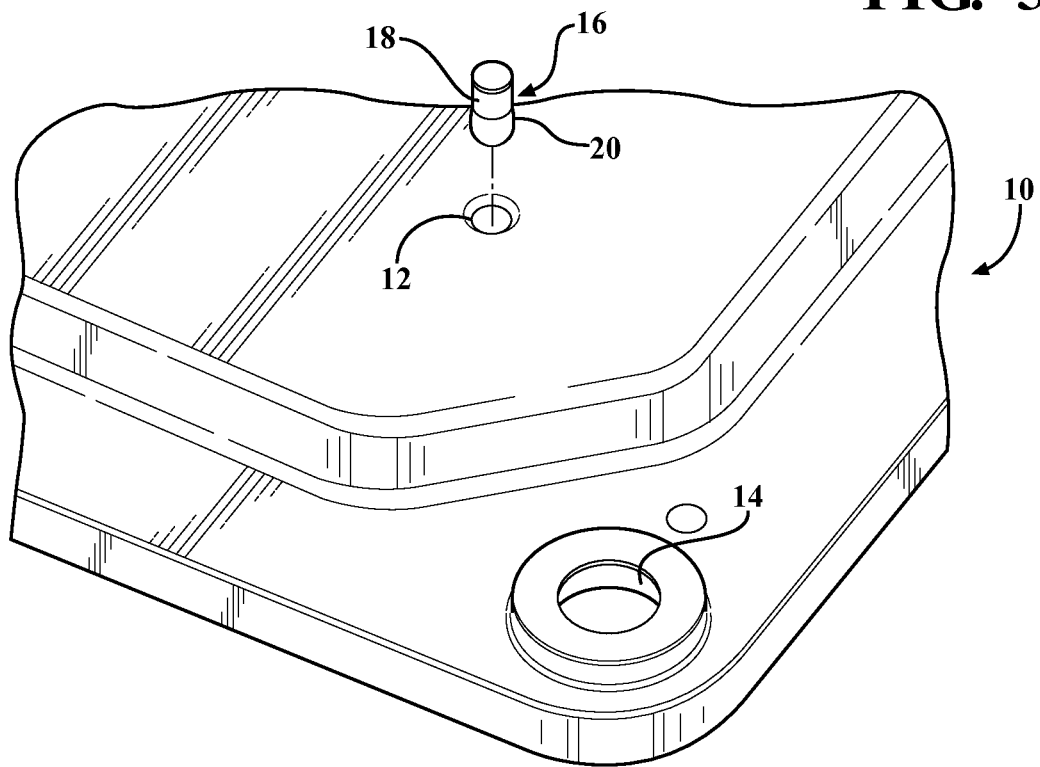
FIG. 3 is an enlarged perspective view of a cover for an ECU and a sealing device, according to embodiments of the present invention.

A cover which is used with an overmolded sealing device according to the present invention is shown in FIGS. 1-3 generally at 10. The cover 10 includes a leak test aperture 12, and several assembly apertures 14 which are used for connecting the cover 10 to the rest of a housing (not shown) of an electronic control unit (ECU). Selectively disposed in the leak test aperture 12 is a sealing device, shown generally at 16 in FIGS. 3-4. The sealing device 16 includes a first portion 18 and a second portion 20. The first portion 18 is made of metal, such as steel, and the second portion 20 is made of a sealing material, which in this embodiment is silicone rubber (VMQ). However, it is within the scope of the invention that other types of materials may be used, such as acrylonitrile-butadiene rubber (NBR), styrene-butadiene rubber (SBR), ethylene propylene diene rubber (EPDM), other types of synthetic rubber, and the like.

The first portion 18 is substantially cylindrical in shape, but may be other shapes to correspond to the shape of different leak test apertures in different covers. The second portion 20 is also substantially cylindrical in shape, but is flexible to contact the inner surface 22 of the aperture 12. During assembly, the device 16 is press-fitted into the aperture 12 using the first portion 18, and is held in place by the first portion contacting the inner surface 22 because of the press-fit. The aperture 12 has an upper diameter 22A, which is sized to allow for a press-fit of the device 16.

Figure 4:
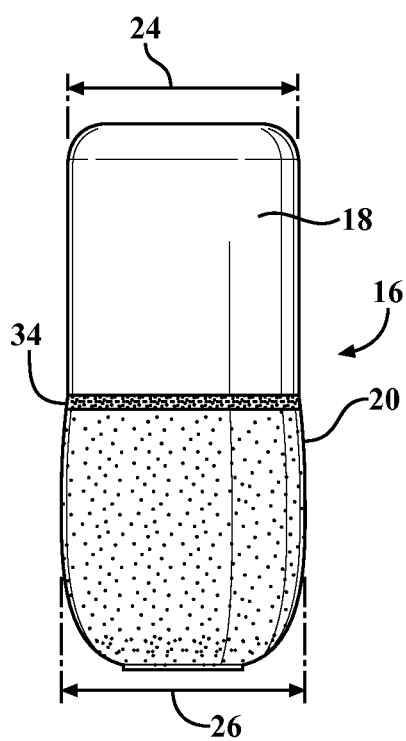
FIG. 4 is a side view of a sealing device, according to embodiments of the present invention.

In the embodiment of the sealing device 16 shown in FIG. 4, the first portion 18 has a first diameter 24, and the second portion 20 has a second diameter 26, which in this embodiment is larger than the first diameter 24 to provide an adequate seal. The second portion 20 shown in FIG. 4 has a varying diameter, and the second diameter 26 is the largest diameter of the second portion 20. However, it is within the scope of the invention that other size diameters for both the first portion 18 and the second portion 20 may be used.

When the device 16 is press-fitted into the aperture 12, the first diameter 24 of the first portion 18 contacts the inner surface 22 of the aperture 12, maintaining the position of the device 16 in the aperture 12. The second portion 20 is also pressed against the inner surface 22 of the aperture 12, providing a sealing function. The second diameter 26 is large enough such that the second portion 20 applies pressure to the inner surface 22, creating a seal, preventing moisture or debris from passing through the aperture 12, and entering into the housing.

Figure 5:
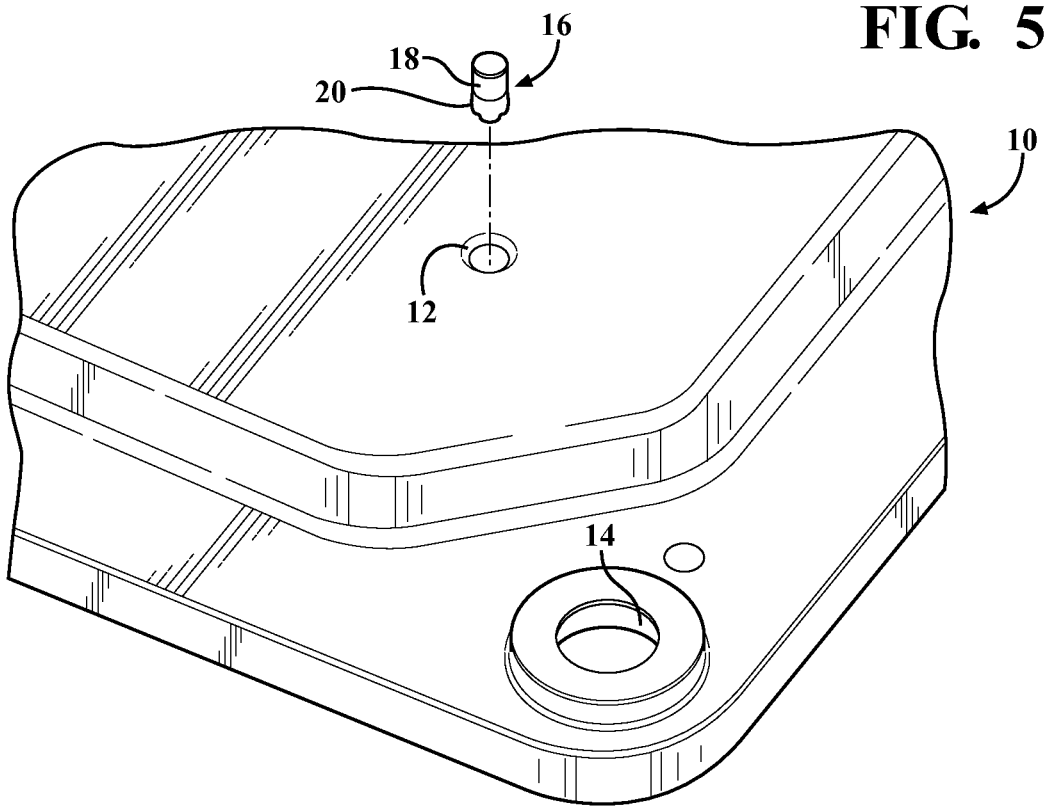
FIG. 5 is perspective view of a cover for an ECU having a leak test aperture which is capable of receiving an alternate embodiment of a sealing device, according to embodiments of the present invention.
Figure 6:
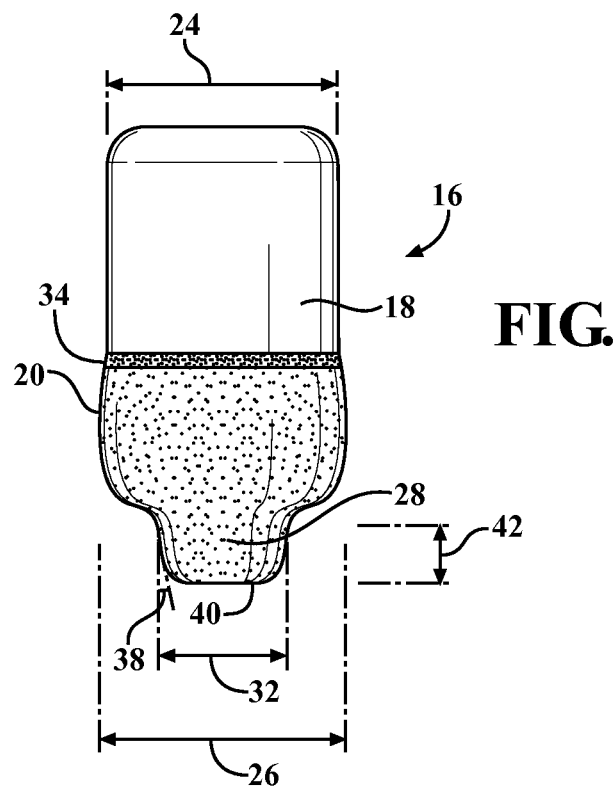
FIG. 6 is a side view of an alternate embodiment of a sealing device, according to embodiments of the present invention.
Figure 7:
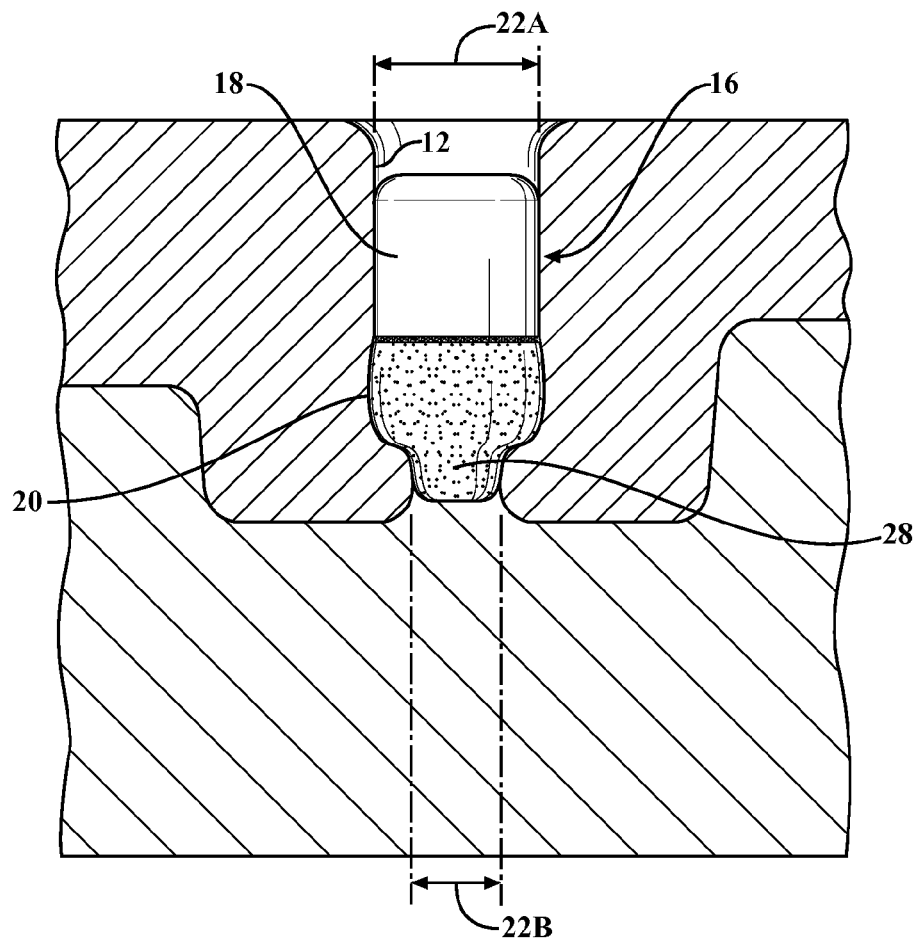
FIG. 7 is a sectional side view of a cover for an ECU and an alternate embodiment of a sealing device, according to embodiments of the present invention.

Another embodiment of the sealing device 16 is shown in FIGS. 5-7. In this embodiment, the second portion 20 not only has the second diameter 26, but a part of the second portion 20 has a tapered portion 28, where the widest diameter portion 32 of the tapered portion 28 is less than the second diameter 26. The tapered portion 28 tapers at an angle 38. The size of the angle 38 may vary, depending upon the desired shape of the tapered portion 28. Additionally, the tapered portion 28 has a thickness 42 between an end surface 40 and the widest part of the widest diameter portion 28. The thickness 42 may vary, depending upon the size of the tapered portion 28 and the size of the second portion 20 which is desired.

The sealing device 16 shown in FIGS. 5-7 is suitable for use with a leak test aperture 12 having a lower diameter 22B. When the sealing device 16 is press-fitted into the aperture 12, the first diameter portion 18 contacts the inner surface 22 of the aperture 12 to maintain the position of the device 16 in the aperture 12, and the second portion 20 also contacts the inner surface 22 of the aperture 12 to provide a sealing function. However, the part of the second portion 20 that has the tapered portion 28 extends into the lower diameter 22B, to provide further sealing. The lower diameter 22B also reduces the risk that moisture and debris could enter the housing through the leak test aperture 12.

Figure 8:
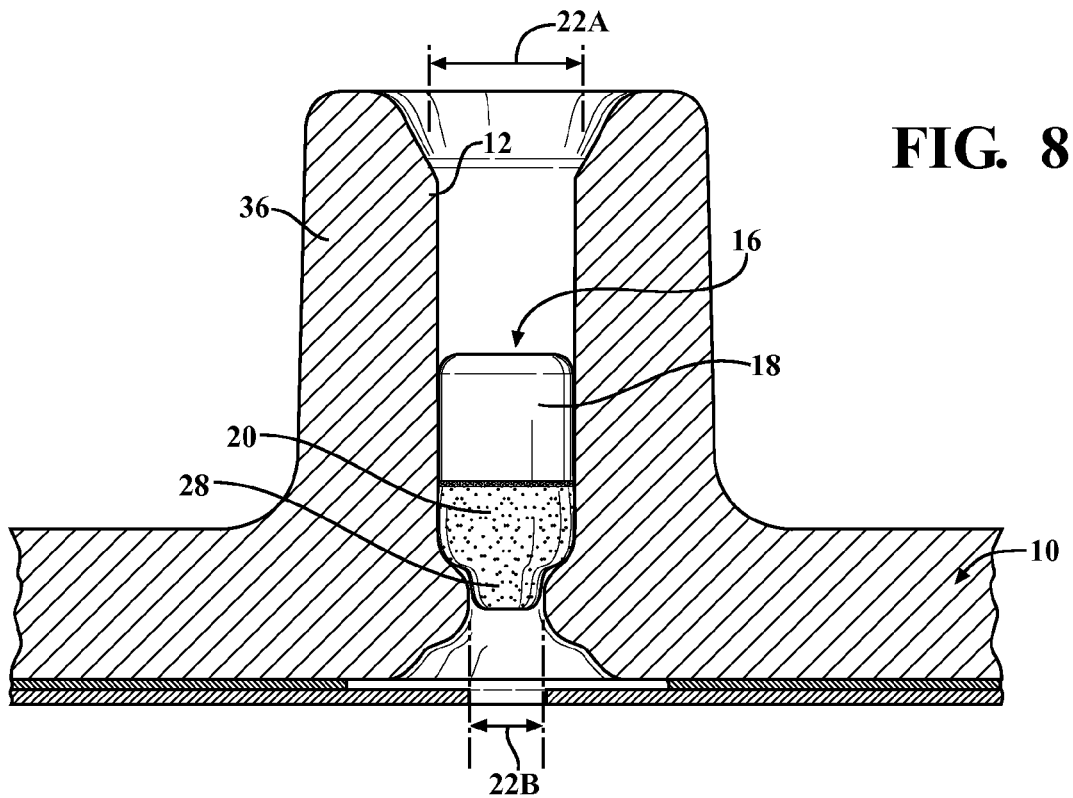
FIG. 8 is a sectional side view of second type of cover used with an alternate embodiment of a sealing device, according to embodiments of the present invention.

Another type of cover 10 is shown in FIG. 8, where the cover 10 is used for a different type of housing. The cover 10 shown in FIG. 8 is used with the embodiment of the sealing device 16 shown in FIG. 6. In this embodiment, the cover 10 also includes a leak test aperture 12, but the leak test aperture 12 has a cylindrical sidewall 36 which extends outwardly away from the cover 10. The leak test aperture 12 in this embodiment also has an upper diameter 22A and a lower diameter 22B. When assembled, the sealing device 16 is press-fitted into the aperture 12, and the second portion 20 contacts the upper diameter 22A, and the tapered portion 28 is disposed in the lower diameter 22B. The first portion 18, second portion 20, and tapered portion 28 may be shaped to fit into differently shaped leak test apertures, making the sealing device 16 suitable for different applications.

In one embodiment, the first portion 18 and the second portion 20 are connected together through the use of an adhesive 34. However, in other embodiments, the portions 18,20 may be connected together in different ways. A combination of different shapes of the first portion 18 and second portion 20 may provide for a connection such as an interference fit between the first portion 18 and the second portion 20. For example, the first portion 18 may have a protrusion with a hook or flange that is received into a complementary-shaped recess formed as part of the second portion 20, or vice versa, providing an interference fit connection between the two portions 18,20.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
   a sealing device, including:
      a first portion;
      a first diameter formed as part of the first portion;
      a second portion connected to the first portion;
      a second diameter formed as part of the second portion;
      a tapered portion formed as part of the second portion;
      an adhesive located between and connecting the first portion to the second portion;
      a leak test aperture;
      an upper diameter portion being part of the leak test aperture; and
      a lower diameter portion being part of the leak test aperture;
      wherein the second diameter is larger than the first diameter, and the sealing device is disposed in the leak test aperture to prevent moisture and debris from passing through the leak test aperture, and the tapered portion is smaller than the second diameter such that the tapered portion is located in the lower diameter portion formed as part of the leak test aperture.

2. The apparatus of claim 1, further comprising:
   an inner surface formed as part of the leak test aperture, the upper diameter portion being part of the inner surface, and the lower diameter portion being part of the inner surface;
   wherein the first portion contacts the upper diameter portion of the inner surface and the second portion contacts both the upper diameter portion and the lower diameter portion of the inner surface when the sealing device is disposed in the leak test aperture such that the first portion is in contact with the inner surface to maintain the position of the sealing device in the leak test aperture, and the second portion is in contact with the inner surface to seal the leak test aperture.

3. The apparatus of claim 1, wherein the first portion is made of metal, and the second portion is made of silicon.

4. An assembly for sealing an aperture, comprising:
   a sealing device;
   a first portion formed as part of the sealing device, the first portion having a first diameter;
   a second portion formed as part of the sealing device such that the first portion is connected to the second portion, the second portion having a second diameter;
   a tapered portion formed as part of the second portion, the tapered portion being smaller than the second diameter;

an adhesive located between and connecting the first portion to the second portion; and
a leak test aperture for selectively receiving the sealing device;
an upper diameter portion formed as part of the leak test aperture;
a lower diameter portion formed as part of the leak test aperture;
wherein the first portion and the second portion are disposed in the leak test aperture such that the tapered portion is disposed in the lower diameter portion, sealing the leak test aperture.

5. The assembly for sealing an aperture of claim 4, further comprising:
an inner surface formed as part of the leak test aperture, the upper diameter portion being part of the inner surface, and the lower diameter portion being part of the inner surface;
wherein the first portion is in contact with the upper diameter portion of the inner surface to maintain the position of the sealing device in the leak test aperture, and the second portion is in contact with both the upper diameter portion and the lower diameter portion of the inner surface to seal the leak test aperture.

6. The assembly of claim 5, wherein the first diameter is smaller than the second diameter, and the tapered portion is smaller than the first diameter.

7. The assembly of claim 4, wherein the first portion is made of metal, and the second portion is made of silicon.

8. An assembly for sealing an aperture of an ECU, comprising:
a sealing device;
a leak test aperture, the sealing device selectively disposed in the leak test aperture;
an inner surface formed as part of the leak test aperture;
a first portion having a first diameter, the first portion formed as part of the sealing device;
a second portion connected to the first portion, the second portion having a second diameter, the second portion formed as part of the sealing device;
an adhesive located between and connecting the first portion to the second portion;
a tapered portion formed as part of the second portion, the tapered portion being smaller than the second diameter; and
an upper diameter portion formed as part of the leak test aperture, the upper diameter portion being part of the inner surface;
a lower diameter portion formed as part of the leak test aperture, the lower diameter portion being part of the inner surface;
wherein the sealing device is press-fitted into the leak aperture such that the first diameter is in contact with the upper diameter portion of the inner surface and the second diameter is in contact with both the upper diameter portion and the lower diameter portion of the inner surface such that the tapered portion is disposed in the lower diameter portion of the leak test aperture when the sealing device is disposed in the leak test aperture, preventing moisture and debris from passing through the leak test aperture.

9. The assembly of claim 8, wherein the second diameter is larger than the first diameter such that the second diameter of the second portion applies a pressure to the inner surface of the leak test aperture, forming a seal.

10. The assembly of claim 8, wherein the first portion is made of metal, and the second portion is made of silicon.

* * * * *